A. F. RANDALL.
AUTOMOBILE STORM CURTAIN.
APPLICATION FILED DEC. 10, 1920.
1,409,968.
Patented Mar. 21, 1922.
2 SHEETS—SHEET 1.
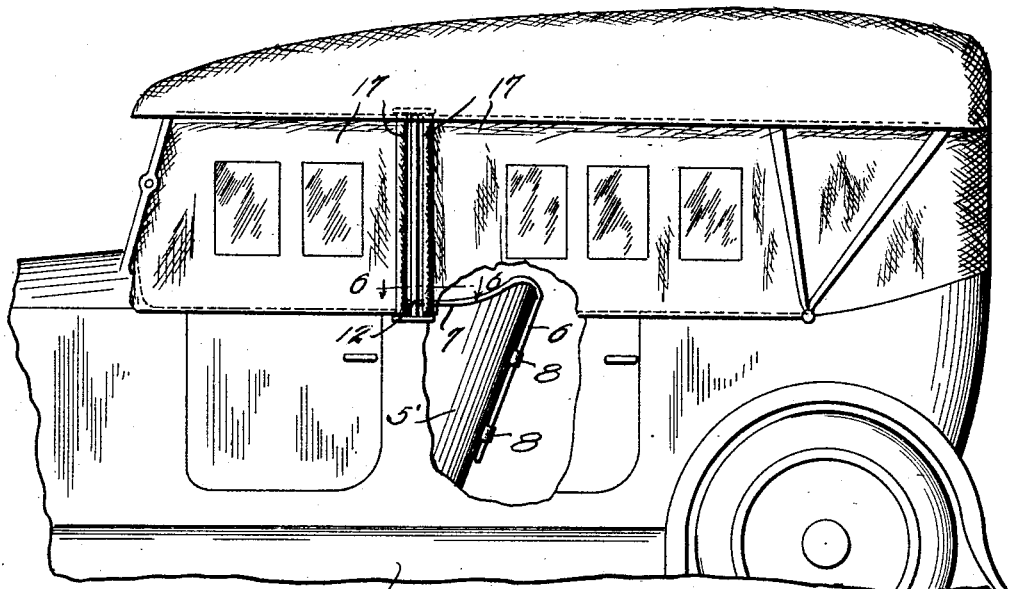
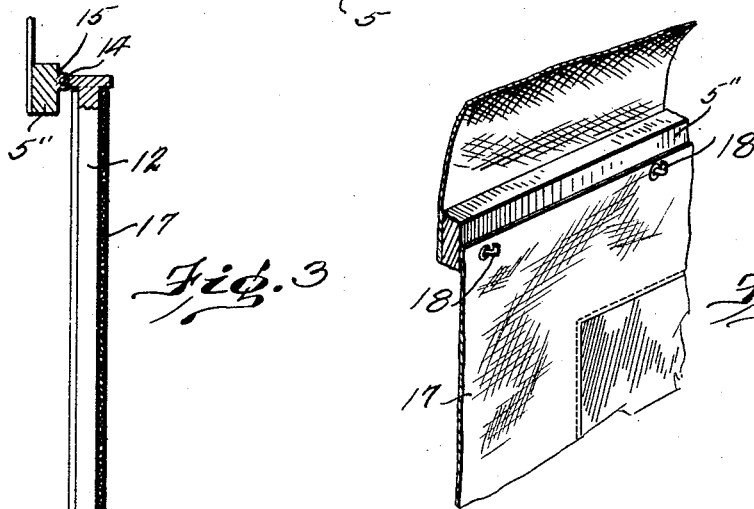
A. F. Randall
INVENTOR.
BY
Norman J. Whitaker
his ATTORNEY.

A. F. RANDALL.
AUTOMOBILE STORM CURTAIN.
APPLICATION FILED DEC. 10, 1920.
1,409,968.
Patented Mar. 21, 1922.
2 SHEETS—SHEET 2.
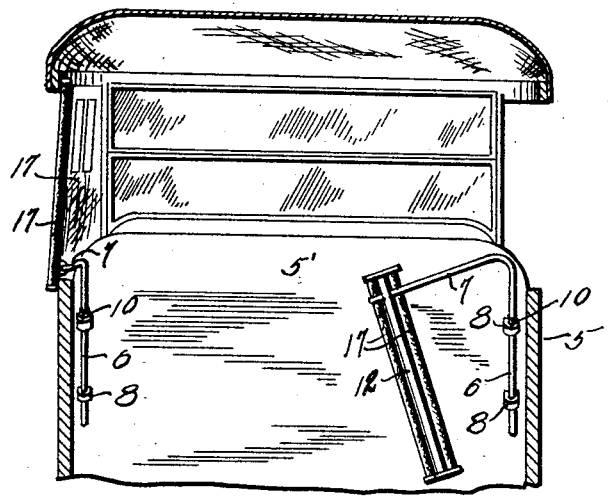
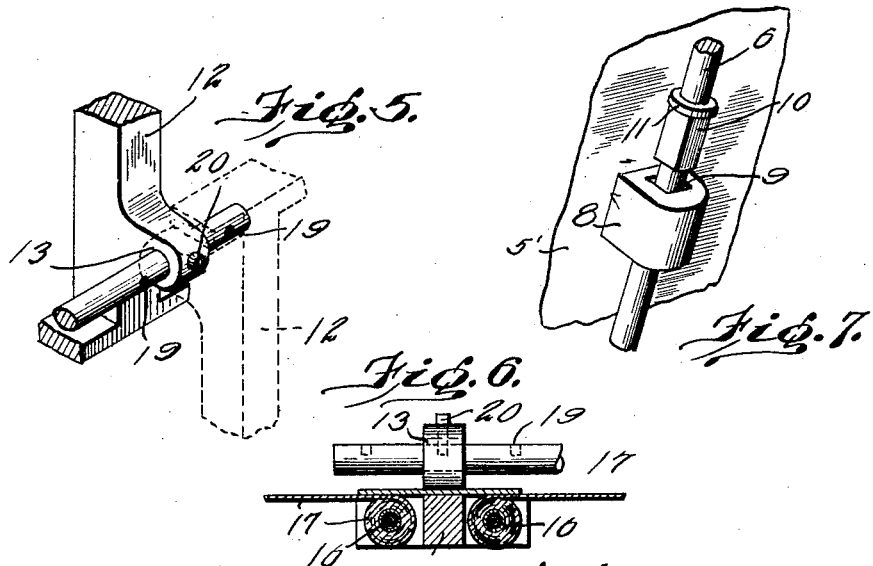
A. F. Randall,
INVENTOR.
BY
Norman J. Whitaker
his ATTORNEY.

UNITED STATES PATENT OFFICE.

ARTHUR F. RANDALL, OF SHREVEPORT, LOUISIANA.

AUTOMOBILE STORM CURTAIN.

1,409,968. Specification of Letters Patent. Patented Mar. 21, 1922.

Application filed December 10, 1920. Serial No. 429,744.

*To all whom it may concern:*

Be it known that I, ARTHUR F. RANDALL, a citizen of the United States, and a resident of Shreveport, in the parish of Caddo and State of Louisiana, have invented a new and useful Automobile Storm Curtain, of which the following is a specification.

My invention relates to automobile storm curtains and has as its primary object the provision of storm curtains of this character which can be conveniently and quickly set up for use and when not in use will be supported rearwardly of one of the seats of the automobile.

Further, the invention provides a storm curtain for automobiles and other vehicles wherein the curtain is supported in such a manner as to be readily grasped by one of the occupants of the automobile or vehicle and arranged in operative position with facility.

It is also an object of importance to provide a vehicle side curtain which includes a plurality of curtains connected as a single unit and in such a manner as to permit the curtains to be set up and extended along the sides of the vehicle from the driver's seat to the rear end thereof, thus protecting the interior of the vehicle at all points against the storm; that is to say, the usual practice of applying the side curtains in sections is obviated.

Still another object of the invention is to provide an automobile side curtain which includes a swinging bracket supported on one of the seats of the automobile upon which a slidable frame, carrying roller curtains, is mounted so that the frame and bracket will be normally disposed against the back of the automobile seat when not in use and which, when desired, the bracket may be swung to embrace one side of the seat and the frame slid outwardly thereon and the curtains then extended for use.

With the preceding and other objects and advantages in mind, the invention consists in the novel combination of elements, construction and arrangement of parts and operations which will be more fully described, claimed and illustrated in the accompanying drawings, wherein:

Figure 1 is a fragmentary elevation of an automobile with the curtain applied thereto and in operative position, parts of the automobile being broken away;

Figure 2 is a fragmentary vertical sectional view of the automobile showing the storm curtains at one side in operative position while the curtains at the opposite side are in inoperative position;

Figure 3 is an enlarged detail view of the curtain carrying frame embodied in the invention;

Figure 4 is a detail perspective of a conventional means for securing one of the longitudinal edges of the curtains to the automobile;

Figure 5 is an enlarged fragmentary perspective of the curtain carrying frame and its mounting, the dotted outline indicating the position of the frame when the same is in inoperative position;

Figure 6 is a transverse sectional view taken on line 6—6 of Figure 2; and

Figure 7 is a fragmentary perspective of the swinging bracket embodied in the combination.

Referring in detail to the drawings wherein similar characters of reference designate similar parts throughout the several views, the numeral 5 designates a conventional type of automobile or other vehicle.

For clarity, two sets of side curtains are shown in Figure 2 and as both are identical the following detail description will apply to both.

In reducing the invention to practice there is provided a swinging bracket including a substantially vertical leg 6 and a horizontally and longitudinally curved leg 7 adapted to embrace and conform to the side of the automobile seat designated at 5'. Bearings or sleeves 8 are mounted upon the rear face of the seat 5' and are disposed in vertical alinement, the uppermost bearing or sleeve being provided with a rectangular bore 9. The vertical leg of the bracket is supported in these bearings 8 and this leg is formed with a rectangular part 10 below its leg 6 and is adapted, at times, to be received in the rectangular bore 9 whereby the bracket is held against accidental rotation or swinging. The leg 6 is further provided with an annular shoulder 11 at the upper end of the rectangular part 10 which, when this part 10 is received in the bore 9, rests upon the upper end of this bearing and thereby limits the downward movement of the bracket.

The numeral 12 designates an I-shaped roller curtain support or frame formed with a laterally disposed ear 13 at one end thereof and having slidable engagement with the curved leg 7. At the opposite end of the frame 12 and upon the outer face thereof a head 14 is carried. This head 14 is adapted to be received in a resilient socket 15 secured to one of the side members 5″ of the automobile top when the frame is in operative position.

Journaled in the frame 12 are spring rotated rollers 16 and adapted to be wound about these rollers 16 are curtains 17 which are so arranged with respect to each other as to be unwound or extended in opposite directions as shown in Figure 1. Any modern type of fastening, such as the fastening 18 shown in Figure 4, may be used to secure the longitudinal edges of the curtains to the top and body of the automobile. In order to secure the frame 12 at any desired point on the leg 6, the latter is provided with a series of recesses 19, any one of which is adapted to be engaged by a set screw 20 carried by the ear 13.

When the curtains are not in use, the bracket is rotated to swing the horizontal leg thereof inwardly against the back of the seat 5′ as shown at the right of Figure 2, at which time the rectangular part 10 is engaged in the bore 9 which serves to hold the bracket against swinging in its bearings. When it is desired to arrange the curtains to operative position the frame 12 is first swung upwardly as shown in Figure 5 and the frame then slid on the leg 7 to the desired position. The frame is first raised vertically to disengage the rectangular part 10, then swung outwardly to dispose the leg 7 along the side of the seat 5′ and the head 14 engaged with the socket 15. The curtains 17 are then unwound from the rollers 16 and extended in opposite directions along the sides of the automobile and secured at their longitudinal edges by means of the fastenings 18.

It is to be understood that the form of my invention herein shown and described is to be taken as a preferred example of the same, and that various changes in the shape, size and arrangement of parts may be resorted to without departing from the spirit of the invention or the scope of the subjoined claims.

Having thus described my invention, what I claim as new and desire to secure and protect by Letters Patent of the United States, is:

1. The combination with a vehicle, of a bracket mounted thereon to swing about a vertical axis, a frame slidably and pivotally mounted on the bracket, the bracket being adapted to be swung to dispose the frame at one side of the vehicle and the frame arranged in a vertical position, and roller curtains journaled in the frame adapted to be extended along the sides of the vehicle, when not in use the bracket being adapted to be swung inwardly and the frame permitted to depend therefrom.

2. In a storm curtain, a bracket to be pivotally mounted to swing about a vertical axis, a frame having pivotal and slidable connection with the bracket and adapted to be arranged in a vertical position, and roller curtains carried thereby, when not in use the bracket being adapted to be swung to one side and the frame allowed to depend downwardly therefrom.

3. The combination with an automobile, of a bracket having a vertical leg and a horizontally arranged leg, the former being mounted for pivotal movement on the back of one of the seats of the automobile and adapted to be swung to a position where the horizontal leg will embrace one side of the seat, a frame slidably and pivotally mounted on the horizontal leg and adapted, when in use, to be arranged vertically at one side of the automobile, means for retaining the frame in such position, and curtains carried by the frame adapted to be extended along the sides of the automobile, when not in use the bracket being adapted to be swung to a position where the horizontal leg will extend inwardly and rearwardly of the seat and the frame allowed to depend therefrom.

4. The combination with a support, of a bracket mounted thereon for pivotal movement about a vertical axis and including a laterally disposed leg capable of being disposed rearwardly or forwardly of the support, a frame slidably and pivotally mounted on the lateral leg and adapted, when such leg is extended forwardly, to be arranged in a vertical position, and roller curtains carried by the frame adapted to be extended in opposite directions at right angles to the support, the frame being adapted to depend downwardly from the lateral leg when the latter is disposed in the rearward position.

5. The combination with an automobile, of a bracket journaled on the rear of one of the seats thereof and including a lateral leg curved to conform to the contour of the seat at one side thereof, a frame slidably and pivotally mounted on said leg and adapted to be arranged in a vertical position when the leg embraces the side of the seat, means for retaining the frame against pivotal movement when in such position, and collapsible curtains carried by the frame and adapted to be extended along the sides of the automobile, when not in use the bracket being adapted to be swung to a position where the lateral leg will extend rearwardly and inwardly along the back of the seat and the frame permitted to depend downwardly therefrom.

6. The combination with an automobile, of a plurality of bearings arranged in vertical alinement on the rear face of one of the seats thereof, one of the bearings being provided with a rectangular bore, a bracket including a vertical leg and a horizontally laterally disposed leg, the former being pivotally mounted in the bearings, a rectangular enlargement on the vertical leg and adapted at times to be received in the rectangular bore, a stop carried by the vertical leg to limit the downward sliding movement of the latter, an I-shaped frame provided with a lateral ear having slidable and pivotal engagement with the horizontal leg, means for holding the ear at any desired point on the horizontal leg, cooperating fastenings between the free end of the frame and top of the automobile to hold the frame against pivotal movement, collapsible curtains carried by the frame and adapted to be extended along the sides of the automobile, when collapsed the curtains and bracket being adapted to be swung inwardly along the back of the seat, the rectangular enlargement being positioned in the rectangular bore when the bracket is in either of its positions to hold the bracket against accidental rotation due to the vibration of the automobile.

ARTHUR F. RANDALL.